United States Patent Office
3,356,318
Patented Dec. 5, 1967

3,356,318
AIRCRAFT LANDING GEAR
Yakov Abramovich Livshits, Krasnokazarmennaya ul. 9, kv. 104, Vladimir Vasilievich Maznin, Krasnokazarmennaya ul. 9, kv. 282, and Vadim Konstantinovich Rezaikin, Kompozitorskaya ul. 19, kv. 3, all of Moscow, U.S.S.R.
Filed Aug. 3, 1965, Ser. No. 476,889
1 Claim. (Cl. 244—104)

The present invention relates to aircraft, and more particularly to the aircraft landing gear, mainly to the main landing gear.

The heretofore known aircraft main landing gear incorporates a bogie attached to the aircraft by means of a shock strut and an LG actuating brace strut coupled to said shock strut. The outer and inner tubes of shock struts of such landing gears are usually coupled by means of two hingedly interconnected links transmitting the torque from the bogie via the inner tube to the outer tube of the shock strut.

The drawback of the known aircraft landing gears is that their shock struts absorb only the vertically directed dynamic forces acting upon the gear in landing and take-off, whereas longitudinal horizontally directed forces imposed directly on the aircraft structure cause considerable harmonic oscillations of structural elements, thus reducing the strength of the airplane and inconveniencing the passengers in taking-off and landing. This is explained by the fact that the shock struts of the above-type landing gears in the extended position are rigidly connected with the airframe through an LG actuating brace strut coupled to the shock strut outer tube.

Besides, under certain conditions, said horizontally acting forces may cause the seizing of shock strut inner tubes.

It is a primary object of the present invention to eliminate the above mentioned drawbacks. It is a specific object of the invention to provide such a landing gear whose shock strut would be able to absorb both vertically and horizontally directed forces acting upon the aircraft landing gear.

These objects are attained by using a landing gear in which a bogie is attached to the aircraft with the help of a shock strut and an LG actuating brace strut coupled to said shock strut, while the outer and inner tubes of said shock strut are joined by two hingedly interconnected links, the brace strut lower end being connected to the shock strut by the hinge coupling the links. Each of said links may be designed as two separate bars rigidly interconnected in the place of installation of the hinge joining said links.

Such a construction of a landing gear provides for the absorption of horizontally directed forces acting on said landing gear and dampending of the aircraft structure longitudinal oscillations caused by said forces, without employment of heavy and complex units and assemblies.

The preferred embodiment of the present invention is exemplified in the following description thereof taken in conjunction with the accompanying drawings, in which.

Figure 1:
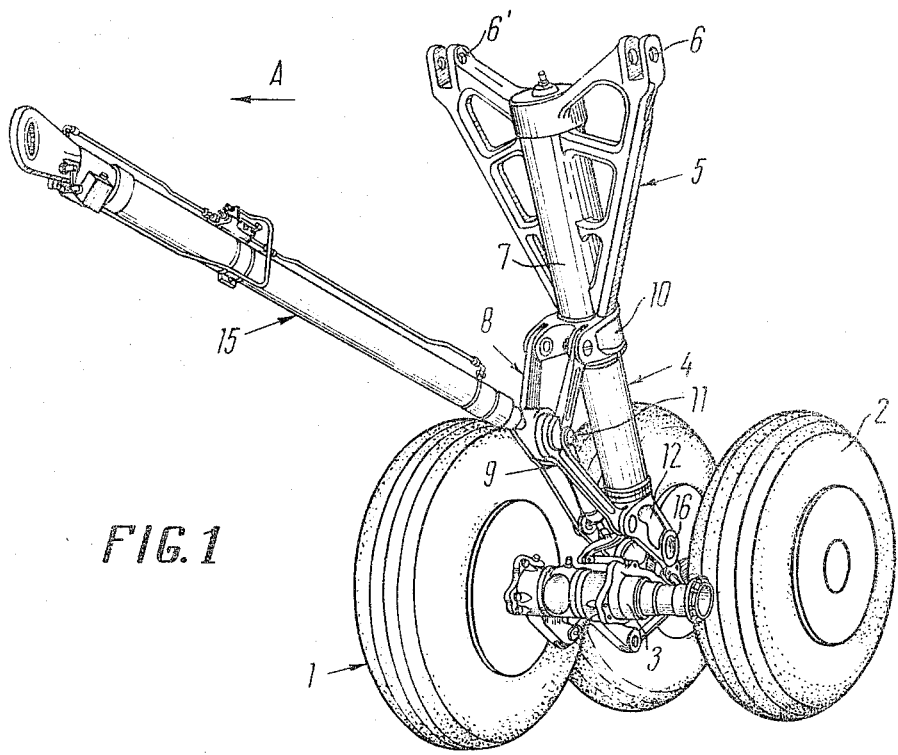
FIG. 1 illustrates a general view of the aircraft landing gear according to the invention.
Figure 2:
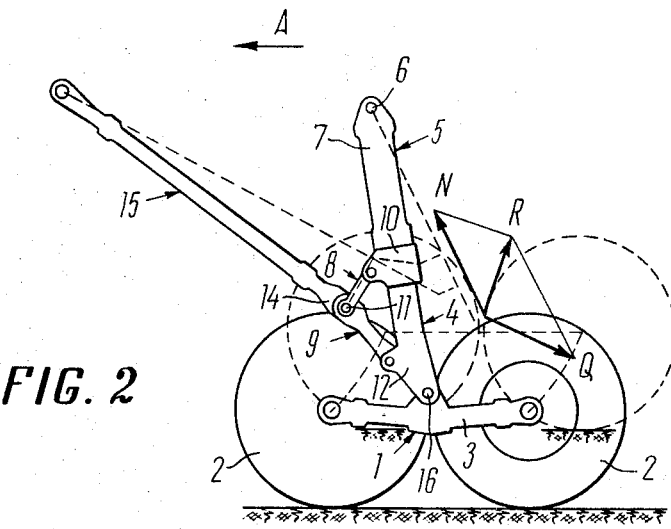
FIG. 2 is a side view of same.

As seen from FIGS. 1 and 2, the aircraft landing gear of the present invention comprises bogie 1 whose wheels 2 are mounted on frame 3 hingedly connected to inner tube 4 of telescopic shock strut 5. Shock strut 5 is suspended from the aircraft by means of hinges 6 and 6'.

Figure 3:
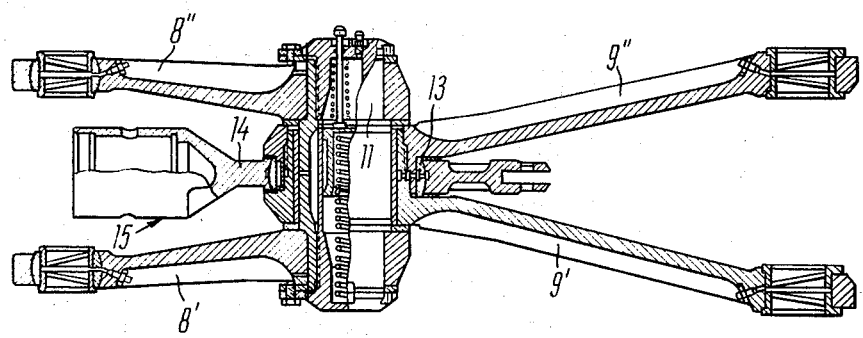
FIG. 3 is an axial cross-section of thehinge connecting the links of the landing gear of the invention, said links being turned in the plane of the drawing for illustrative purposes.

Outer tube 7 and inner tube 4 of shock strut 5 are interconnected with two links: upper link 8 and lower link 9. Each of said links consists of two bars 8' and 8", 9' and 9". The upper ends of bars 8' and 8" are hingedly connected with lower head 10 of outer tube 7 of shock strut 5, whereas lower ends of these bars are rigidly interconnected through shaft 11 (FIG. 3) coupling upper link 8 with lower link 9. The upper ends of bars 9' and 9" of lower link 9 are rigidly intreconnected by means of the thread, said bars 9' and 9" having the hole receiving shaft 11. The lower ends of bars 9' and 9" are hingedly connected to lower end 12 of inner tube 4 of shock strut 5. Arranged between bars 8' and 8" is ball bearing 13 (FIG. 3) mounting eye 14 of the lower end of LG actuating brace strut 15. The upper end of LG actuating brace strut 15 is hingedly connected to the aircraft structure. LG actuating brace strut 15 is a reversible hydraulic cylinder with a rod secured in the extended position of the landing gear by means of an inner lock (not shown in the drawings).

The distance between the hinges of links 8 and 9 is so selected that with shock strut 5 being compressed to any degree the axle of LG actuating brace strut 15 and the axle of lower link 9 are approximately in one line passing through hinge 16 of the attachment fitting of bogie 1 to inner tube 4 of shock strut 5. Owing to this the shock strut is relieved from the effect of the action of bending moments caused by vertical and longitudinally horizontal forces acting on the landing gear.

The aircraft landing gear of the present invention operates as follows. When wheels 2 touch the ground in landing, bogie 1 is acted upon by dynamic force F (FIG. 2) which is a resultant of vertical and longitudinally horizontal forces (broken lines in FIG. 2 show the position of the landing gear with shock struts 5 fully compressed). From bogie 1 force R is transmitted through hinge 16 to shock strut 5 and LG actuating brace strut 15 with link 9, which are the components of the stress-carrying system with a resilient (shock strut 5) and a rigid (LG actuating brace strut 15 with link 9) element. With this type of a stress-carrying system force R acts as two forces N and Q directed along the longitudinal axes, i.e. along the axes of shock strut 5 and LG actuating brace strut 15, respectively. Being compressed by the action of force N, shock strut 5 thus absorbs both vertical and horizontal stresses acting on the landing gear. Since LG actuating brace strut 15 is kept by the lock in the extended position of the landing gear and is, in this case, a rigid element of a constant length, any compression of shock strut 5 causes its turning (swinging) with respect to hinges 6 and 6' in the direction reverse to that of the aircraft motion (along arrow A), and simultaneous displacement of wheel bogie 1 in vertical and horizontal directions. Thus, the swinging shock strut according to the present invention provides for the absorption of both vertically and horizontally acting forces. Should the landing gear be affected only by horizontally-directed forces during aircraft braking, in case of shock of wheels against obstacle, the shock strut, with constantly acting vertical force (aircraft weight), will be additionally compressed as well, thus absorbing said forces.

What we claim is:

An aircraft landing gear comprising a shock strut having telescopic outer and inner tubes, the outer tube having one end adapted to be hingedly connected to the airframe of an aircraft so that it will be directed downwardly, the inner tube having an outer end adapted to be hingedly connected to a bogie of an aircraft; a first link means pivotally connected at one end to the inner end of said outer tube; a second link means pivotally connected at one end adjacent the outer ends of said inner tube; a landing gear actuating brace strut having one end adapted to be connected to an airframe of an aircraft; hinge means; each of the other ends of said link means being connected to said hinge means so as to couple said other ends of said link means together; said link means extending in the forward direction of movement of an aircraft; said brace strut being pivotally connected to said hinge means and also extending in the forward direction of movement of an aircraft; and the length of said link means being so chosen that within the operating range of compression, said shock strut inclines rearwardly with respect to the direction of motion of the aircraft and said second link means forms together with said brace strut a straight line passing through the hinge means whereby longitudinal forces acting on said landing gear are absorbed and bending of the shock strut by longitudinal forces is prevented.

References Cited

UNITED STATES PATENTS

| | | | |
|---|---|---|---|
| 2,275,371 | 3/1942 | Magrum | 244—104 |
| 2,308,573 | 1/1943 | Thornhill | 244—102 |
| 2,315,098 | 3/1943 | Simpson et al. | 244—102 |
| 2,490,485 | 12/1949 | Spaeth | 244—102 |
| 2,896,884 | 7/1959 | Perdue | 244—102 |
| 3,062,485 | 11/1962 | Hartel | 244—102 |

FOREIGN PATENTS

| | | |
|---|---|---|
| 508,158 | 6/1939 | Great Britain. |

MILTON BUCHLER, *Primary Examiner.*

P. E. SAUBERER, *Assistant Examiner.*